Nov. 10, 1964     L. P. FINNEGAN ETAL     3,156,581
PRESSURE-SENSITIVE ADHESIVE TAPE AND IMPREGNATED FIBROUS WEB
Filed Aug. 1, 1958
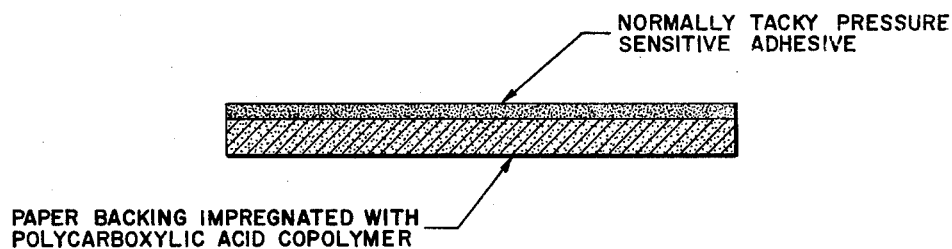
INVENTORS
Larry P. Finnegan &
Verle A. Miller
BY
ATTORNEY 3,156,581
PRESSURE-SENSITIVE ADHESIVE TAPE AND IMPREGNATED FIBROUS WEB
Larry P. Finnegan and Verle A. Miller, Dover, Del., assignors, by mesne assignments, to Milky Way Products Company, Dover, Del., a corporation of Delaware
Filed Aug. 1, 1958, Ser. No. 752,429
22 Claims. (Cl. 117—76)

The present invention relates to improved unified non-woven fibrous articles, such as fibrous webs or mats, internally bonded with particular diene-containing polymers, and more particularly, the invention relates to flexible non-woven fibrous sheeting, such as paper, non-woven fabrics, and the like, containing certain diene-containing copolymers exhibiting string affinity for the fibers and imparting a high internal bond strength to the unified mass. In a specific aspect, the invention involves impregnated paper backing sheets suitable for fabrication into pressure-sensitive adhesive tapes, and the tapes so produced, such sheets being characterized by an unexpected development of unusually high internal bond strength and a resultant high resistance to delamination of the paper backing, in combination with other advantageous properties.

Both natural and synthetic polymer latices have been used in the impregnation or saturation of non-woven fibrous materials to convert these materials into useful articles by bonding of the fibers to provide internal strength and to develop other specific properties, such as non-hygroscopicity. The term "non-woven" fibrous material means a mat, web, or sheet of fibers laid down by mechanical, pneumatic, electrical or vacuum means, or otherwise deposited. The typically open, highly porous and unbonded structure of webs or mats made of such fibrous materials inherently has little or no internal bond and hence little or no resistance to delamination, splitting and tearing.

In many applications of bonded non-woven fibrous materials, it is essential to highly develop the internal bond strength, in order to avoid splitting or delaminating of the fibrous structure when subjected to the stresses of normal use. The internal bond strength should also be retained even after storage under normal conditions. In addition, the ability of such impregnated or saturated fibrous masses to tolerate pigmentation with retention of high internal bond strength; to exhibit good elongation characteristics, resistance to oils and solvents, and non-discoloration are often necessary or desirable properties for the many end product forms of such fibrous materials.

Various general purpose synthetic copolymer latices have been applied as bonding agents for the unification of non-woven fibrous sheeting, for example, in the saturation of paper backing for pressure-sensitive adhesive tape. However, in practice such copolymers have had limitations as impregnants. For example, it is customary to substantially completely saturate the sheeting to achieve satisfactory internal bond strength. Such saturation generally involves 95 to over 100 percent impregnation (expressed as percentage by weight of dry latex solids to weight of dry fiber). In contrast the present invention achieves high internal bond strengths at lower copolymer content, or improved internal bond at comparable degrees of impregnation.

It has been found unexpectedly, that non-woven fibrous articles of highly improved internal bond strength are obtainable by unifying the fibrous materials with polycarboxylic acid-containing diene polymers.

Diene copolymers particularly suitable for use in the unifying compositions of the invention are polycarboxylic acid-containing copolymers prepared from monomeric material at least predominantly comprising one or more aliphatic conjugated dienes and one or more non-carboxylic ethylenically unsaturated monomers copolymerizable with the diene, the polycarboxylic acid content being derived from the non-carboxylic monomer, or supplied by a separate substance. In other words, the copolymers of the invention may be formed by direct copolymerization of a monomer mixture of a diene, a non-carboxylic monomer and a polycarboxylic acid or anhydride, or by other methods, such as by copolymerization of a diene and a non-carboxylic monomer from which the acid groups may be derived after polymerization. The term "ethylenically unsaturated monomers" includes copolymerizable monoolefinic monomers, and is to be construed as excluding conjugated dienes, but may include other polyolefinic monomers, e.g. where the polycarboxylic acid content of the copolymer is obtained by copolymerization of the diene with a copolymerizable ester or other hydrolyzable compound of a polyolefinic polycarboxylic acid followed by hydrolysis to form the acid groups in the copolymer, as described below. The term "non-carboxylic" means the monomer is devoid of carboxyl (COOH) groups and salts formed by such groups.

Such polycarboxylic acid polymers may be advantageously obtained by copolymerization in acid aqueous dispersion of a minor portion of at least one copolymerizable olefinically unsaturated polycarboxylic acid with a major portion of one or more aliphatic conjugated dienes and one or more copolymerizable non-carboxylic monoolefinic monomers. The term "monoolefinic" means monoethylenically unsaturated, and the term "non-carboxylic" has the same meaning as set forth above. The non-carboxylic monomer appears to facilitate direct copolymerization of the acid, and the proportions of diene and non-carboxylic monomer may widely vary, as set forth below.

The unexpectedly high internal bond strength is advantageously obtainable with a relatively small content of polycarboxylic acid in the diene copolymer and effective amounts may be as low as about 0.005, expressed as carboxy (COOH) equivalents per hundred grams of copolymer. On the other hand, the polycarboxylic acid content in the copolymer may be much higher, such as that obtainable in the acidic aqueous copolymerization of the copolymerizable olefinically unsaturated polycarboxylic acid with a major portion of the diene and monoolefinic monomer constituents, or such as are obtainable through introduction of the polycarboxylic acid into the copolymer by other suitable methods abovementioned and hereinater described.

As stated above, one of the outstanding advantages obtained in the unification of non-woven fibrous articles with the polycarboxylic acid-containing diene copolymers is the unusually high internal bond developed. For instance, papers saturated with such copolymers at the 90 to 100 percent saturation level exhibited internal bond strengths measured by resistance to delamination as high as one and one-half to two times greater than those obtained with copolymer saturants devoid of polycarboxylic acid content. In practical application, a major advantage of the invention is the ability to use a lower degree of saturation of the fibers, for example, 60 percent, while still obtaining internal bond strength comparable to those obtainable with substantially total saturation, i.e. 95 to 100 percent with butadiene-nitrile and butadiene-styrene latex saturants containing no polycarboxylic acid.

In addition to this improvement, the polycarboxylic acid-containing copolymers permit the development of unique combinations of properties with the high internal bond strength, which are not obtainable with the ordinary synthetic latices when used as saturants, among which may be mentioned, the retention of high internal bond strength with pigmentation, high elongation with retention of internal bond and tensile strengths, resistance to oils and solvents, and non-discoloration on exposure to ultraviolet light, and in tape applications the avoidance of a tie or primer coat for securing the pressure-sensitive adhesive to the bonded fibrous backing.

The fibrous masses may have a suitable copolymer content imparted by impregnation, such as dip saturation of preformed webs or sheets, or by beater addition of an aqueous dispersion of copolymer directly to the fibers prior to formation of any web or sheeting. In these processes, the copolymer is preferably deposited from aqueous dispersions onto the fibers and within the interstices of the open, porous web or sheeting.

An added advantage of the copolymer latices of the invention is that the pH is not confined to a narrow range. The dispersions for impregnation may be acid, that is, they may be used after acid polymerization without neutralization, or if desired, they may be neutralized prior to impregnation of the fibrous articles. Where the polycarboxylic acid groups are formed from or introduced into the preformed copolymer, the copolymerization of the diene and the comonomer may be in alkaline aqueous medium. To provide a finished internally bonded saturated web or sheeting, the material is freed of excess saturant, usually by passing through squeeze rolls or the like, and is then subjected to a drying operation.

In general, the polymer content on a dry solids basis may be from about 30 percent to 60 percent by weight of the dry unified web or sheeting. For a particular polymer, the internal bond strength varies with polymer content. This corresponds approximately to 40 to 150 percent saturation or pickup.

It is also advantageous in the practice of the invention to subject the unified fibrous article to heat treatment for short periods of time at elevated temperature, such as from above 150° F. up to about 400° F., the time of heat treatment preferably decreasing with increasing temperature. This enhances the internal bond strength of the article.

The polycarboxylic acid-containing copolymers are preferably ter- or multi-polymers formed by the acid copolymerization of monomeric material containing a major portion of one or more aliphatic conjugated dienes, preferably 1,3-conjugated dienes having 4 to 10 carbon atoms, such as butadiene-1,3, and one or more non-carboxylic copolymerizable monoolefinic monomers, and a minor portion of at least one copolymerizable olefinically unsaturated polycarboxylic acid.

In polymerizations where the acid polymer is directly produced, suitable acids are characterized by possessing one or more olefinic carbon-to-carbon double bonds and two or more carboxyl groups, in which at least one of the olefinic carbon-to-carbon double bonds is activated, as is understood in the polymerization art, to render the acid copolymerizable with the butadiene and the non-carboxylic monoolefinic monomer.

It is advantageous to utilize one or more olefinically unsaturated polycarboxylic acids containing an activated olefinic double bond which readily functions in an addition polymerization reaction because it is present in the monomer molecule either in the alpha-beta position with respect to a strongly polar or functional group, such as carboxyl or others which are well known as activating groups, or because it is adjacent to a terminal methylene group, $CH_2=C<$.

In general, the typically suitable polycarboxylic acids may be represented by the following formula:

$$R-CH=CY-(Z)_x-COOH$$

in which R is preferably hydrogen or carboxyl, but may be carboxylic ester, alkyl or alkenyl, Y is hydrogen, carboxyl, halogen, cyano, sulfo, alkyl, aryl, thienyl or furyl, Z is a methylene or a substituted methylene group, or an allyl, arylene, thienylene or furylene divalent radical, $x$ is zero or any whole number, suitably not exceeding 3, and in which at least one of the groups R and Y is carboxyl, or Z is carboxyl-containing.

For example, such olefinically unsaturated polycarboxylic acids include fumaric, maleic, citraconic, mesaconic, itaconic, aconitic, ethyl maleic acid, methyl itaconic, muconic, hydromuconic, glutaconic; 3-carboxy-pentadiene-(2,4)-oic-1, beta-(p-carboxyphenyl) acrylic, 2,4-pentadiendioic-1,3 acid, the dimer and trimer of methacrylic acid and other monoolefinic and polyolefinic polycarboxylic acids. The utilization of these copolymerizable polybasic acids or their anhydrides which are readily hydrolyzed in the acidic polymerization provides a means for direct introduction of the polycarboxylic acid groups into the polymer chain.

Other methods for formation or introduction of the polycarboxylic acid groups to obtain the desired polymer may be utilized. One such method is the copolymerization with the aliphatic conjugated diene, of copolymerizable partial or full esters of the olefinically unsaturated polycarboxylic acids, followed by hydrolysis of a part or all of the ester groups to obtain the polycarboxylic acid groups in the polymer chain. This may be accomplished, for example, by hydrolysis in alkaline medium under suitable temperature and pressure conditions. Acidification of the resulting salt produces the free acid.

U.S. patent to Brown, 2,710,292, discloses a hydrolysis method of forming carboxyl-containing diene polymers.

The copolymers may be prepared from monomeric materials containing hydrolyzable groups other than the carboxylic ester group, such as nitriles, amides and acid chlorides to yield the free polycarboxylic acid groups on hydrolysis.

In such cases, the copolymerization system may consist simply of the diene and the ester of the polycarboxylic acid where the ester replaces completely both the polycarboxylic acid and the monoolefinic monomer, or the ester may merely replace the acid in whole or in part, with or without replacing a part of the monoolefinic monomer.

The aliphatic conjugated dienes suitable for the preparation of copolymers of the invention are advantageously selected from those containing from 4 to about 10 carbon atoms, and include the butadiene-1,3 hydrocarbons, such as butadiene-1,3; 2-methyl butadiene-1,3 (isoprene); 2,3-dimethyl butadiene-1,3; 2-neopentyl butadiene-1,3; and other hydrocarbon homologs of butadiene-1,3; and, in addition, the substituted dienes such as 2-chloro butadiene-1,3; 1- or 2-cyano-butadiene-1,3; the straight chain conjugated pentadienes such as piperylene; the straight and branch-chain conjugated hexadienes and others. In general, dienes containing more than 10 carbon atoms polymerize very slowly, if at all, in present polymerization systems, and it is therefore preferred to employ a diene having 10 carbon atoms or less, while dienes having from 4 to 6 carbon atoms have particularly advantageous reaction rates and polymerization characteristics and are much preferred.

The non-carboxylic monoolefinic monomer, which together with the aliphatic conjugated diene constitutes a major portion of the monomeric material for directly preparing the copolymers useful in the invention may be any such monomer, which is copolymerizable with the diene, as is well known in the art, and indicated by typical monomers set forth below. In particular, the non-carboxylic monoolefinic monomer is characterized as one which contains an activated carbon-to-carbon double bond, that is, a monomer containing an olefinic double bond which readily functions in an addition polymerization reaction because of the olefinic double bond being present in the monomer molecule either in the alpha-beta position with respect to a strongly polar or functional group, such as nitrile, carboxylic ester, halogen, keto, amide and other such groups well known in the art as activating groups, or because it is adjacent to a terminal methylene group, i.e. $CH_2=C<$. Among the monoolefinic monomers copolymerizable with the dienes in aqueous dispersion and characterized by the presence of such groupings may be mentioned aliphatic unsaturated nitriles, such as the low molecular weight nitriles, acrylonitrile, alpha-chloro acrylonitrile, methacrylonitrile, ethacrylonitrile, the low molecular weight alcohol esters of acrylic and substituted acrylic acids, such as methyl methacrylate, methyl acrylate, methyl ethacrylate, butyl methacrylate, isobutyl dichloracrylate and other acrylic esters of alcohols, preferably having from 1 to 6 carbon atoms; styrenes, such as styrene itself, halo, cyano, alkyl, aryl, and other substituted styrenes, for example, vinyl toluene, alpha methyl styrene, alpha chloro styrene, p-cyanostyrene, p-phenylstyrene; other polymerizable vinyl compounds, such as vinyl naphthalene, vinyl pyridine, vinyl ethers and ketones, and other compounds, such as vinylidene chloride.

It is preferred to employ copolymerizable monolefinic monomers selected from the group consisting of nitriles, styrenes and lower molecular weight alcohol esters of acrylic and alpha-substituted acrylic acids.

When the copolymer is produced by copolymerization of the polycarboxylic acid, the copolymerizable monoolefinic monomer apparently facilitates the introduction of the polycarboxylic acid groups into the copolymer, as indicated by the developed internal bond in the unified fibrous articles, and present analytical methods for the determination of carboxyl content in the polymer chain, such as alkalimetric titration of the copolymer solution with alcoholic KOH to a phenolphthalein end point.

The monomeric material advantageously may vary within very wide limits in regard to amounts of diene and non-carboxylic monolefinic compound. Thus, the invention provides for the preparation of the polycarboxylic acid-containing copolymers from monomeric mixtures of from about 10 to 75 percent by weight of the total monomer charge of one or more of the monolefinic monomers and from about 20 to 90 percent by weight of the conjugated diene, the combined weight of these two monomeric materials being a major portion of the total monomeric mixture. When the polycarboxylic acid constitutes a part of the monomer charge it may be present in amounts from as low as about 0.5 percent up to any minor portion, i.e. less than half, and may consist of one or more olefinically unsaturated polycarboxylic acids. The polybasic acid charge in the direct emulsion copolymerization of the polycarboxylic acid-containing copolymer economically constitutes from about 1 to 20 percent by weight of the monomer charge, since it has been found that the major advantages of the invention can be achieved with such amounts. It is a distinct advantage of the invention that the excellent internal bond strengths are obtainable with relatively small quantities of polybasic acid, such as 1 to 5 percent.

The copolymerization of the polycarboxylic acid-containing copolymers is advantageously effected by emulsification of the monomers in an acid aqueous medium using emulsifiers stable therein. Suitable emulsifiers include the ethers and esters of polyglycols with aliphatic acids having from 10 to 20 carbon atoms; alkyl sulfonates or sulfates and alkaryl sulfonates where the alkyl group contains from 10 to 20 carbon atoms, alkaryl polyether sulfates or sulfated monoglycerides and similar emulsifiers that will occur to those skilled in the art. A particularly effective type of emulsifier has been found to be the amine salts of alkaryl sulfonates. The polymerization known to the art. The polymerization reaction may be system may also include small amounts of stabilizers promoted by the addition of free-radical yielding initiators such as the alkali persulfates, percarbonates, perborates and the like, organic peracids, such as benzoyl peroxide, acetyl peroxide, and the like, alkyl peroxides such as di-t-butyl peroxide and organic hydroperoxides, such as diisopropylbenzene hydroperoxide. Redox systems of initiation may be employed utilizing the above-mentioned substances with suitable reducing agents well known in the art. The polymerization mass may also contain small amounts of the sulfhydryl-group-containing compounds termed "modifiers" in the synthetic rubber industry, such as alkylmercaptans containing from about 10 to 22 carbon atoms, e.g. n-dodecyl mercaptan, the commercially available mixed tertiary mercaptans containing from 12 to 16 carbon atoms, thiophenol, alpha- or beta-thionaphthol and the like. The polymerization can be effected within a wide range of temperatures; for example, within the range from 5° to 70° C. The above method conveniently results in the formation of polymer in the form of a latex or suspension of small drops or globules.

It may be desirable to introduce the polybasic acid to the monomer mixture gradually during the course of the polymerization reaction, rather than as a single charge at the time of initiation in order to provide greater homogeneity of the composition of the polymer chain with respect to the amount and distribution of the polycarboxylic acid groups.

The synthetic latex thus prepared is ready for use as a non-woven fibrous material saturant or impregnant without the necessity of neutralization, or alternatively the polymerization may be effected using well known anionic or non-ionic emulsifiers, followed by neutralizing or alkalizing of the emulsion, e.g. with ammonium hydroxide, to pH 7 or above without coagulation.

It is advantageous in terms of ease of copolymerization, properties of the copolymer latex, and for the development of the highest internal bond strengths in combination with other desirable properties, above-mentioned, to select certain ranges (expressed as percent by weight of the monomer mixture) for the diene and preferred monoolefinic monomers charged to the mixture of monomeric materials for the polymerization. For instance, nitriles, such as acrylonitrile, when copolymerized in amounts of from 10 to 45 percent, preferably 15 to 35 percent, with at least 50 percent of the diene, and 1 to 5 percent of the polycarboxylic acid provide high internal bond in the impregnated fibers with excellent oil and solvent resistance. With styrene and substituted styrenes, amounts of from 10 to 75 percent, preferably 15 to 70 percent, may advantageously be used. When utilizing lower molecular weight alcohol esters of acrylic and alpha-substituted acrylic acids, such as methyl methacrylate, it is preferred to charge from about 10 to 70 percent by weight for the development of internal bond strength, while imparting to the bonded fiber the property of non-discoloration on exposure to ultraviolet light.

It is to be understood, however, that lesser quantities of any of these preferred monomers may be present when more than one is utilized. In general, the larger the total amount of such monolefinic monomers, the greater the increase in plastic properties, and decrease in the elastomeric properties of the copolymer with development of high tensile strength and lower elongation.

Thus, with various combinations of the monoolefinic monomers, unique combinations of properties may be imparted to the fibrous articles impregnated with these copolymers, while producing internal bond strength heretofore unattainable with either general or specific purpose synthetic latices which do not contain polycarboxylic acid in the polymer.

It is also within the scope of the invention to utilize the copolymers herein described in admixture with other copolymers in emulsion form for the unifying of non-woven fibrous articles, such as diene-nitrile and diene-styrene copolymers, and other copolymers containing carboxyl groups derived from monocarboxylic acids, such as diene-nitrile-methacrylic acid, diene-styrene-methacrylic acid copolymers. In the case of such blends, due to the high internal bond strength developed by the polycarboxylic acid copolymers of the invention, substantial amounts of the other copolymers, e.g. up to about half of the mixture, may be utilized without undue decrease in the development of this property in the impregnated fibers.

In certain applications, such as unified paper backing for pressure-sensitive adhesive tape or other flexible non-woven unified sheeting, it is particularly desirable to enhance the elongation properties of the article. However, when nitrile copolymers are made with a high diene content, for example, 70 percent or more, or are softened by use of modifiers for development of the desired elongation, they generally possess a lower than desirable tensile strength which prevents attainment of the desired elongation property. It has now been found possible to provide such desirable elongation, in combination with adequate tensile strength and the excellent internal bond strength characteristic of the unified fibers of the invention, by the inclusion in the monomer mixture of relatively small quantities of a strength imparting monomeric material, such as acrylic and substituted acrylic acids, and other copolymerizable ethylenically unsaturated monocarboxylic acids, such as, crotonic acid, alpha-chlorocrotonic acid, hydroscorbic acid, cinnamic acid, m-chlorocinnamic acid, p-chlorocinnamic acid, acrylic acid, alpha-chloroacrylic acid, methacrylic acid, ethacrylic acid, vinyl thiophenic acid, alpha-furyl acrylic acid, vinyl furoic acid, p-vinyl-benzoic acid, vinylnapthoic acid, alpha-isopropenyl acrylic acid, alpha-styryl acrylic acid, (2-carboxy-4-phenyl-1,3-butadiene), sorbic acid, alpha-methyl sorbic acid, alpha-ethyl sorbic acid, alpha-chlorosorbic acid, alpha-bromosorbic acid, beta-chlorosorbic acid, alpha- beta-, or gamma-epsilon-dimethyl sorbic acid, 2,4-heptadienoic acid, 2,4-hexadienoic acid, 2,4-pentadienoic acid, alpha-vinyl cinnamic acid, and alpha- and beta-vinyl arcylic acids. Small amounts of the monocarboxylic acids (from about 0.5 percent) are effective for this purpose, and advantageously the amount need be no more than about 5 percent by weight of the monomer mixture.

In some instances, the presence of a monocarboxylic acid in the copolymer preparation enhances the internal bond strength, and their use in the invention is not dependent on any particular diene content or the presence of a nitrile in the copolymer.

As another feature of the invention, the polycarboxylic acid copolymers have been found to develop excellent elongation properties in the impregnated fibrous articles (with retention of the high internal bond strength) by the substitution of isoprene for butadiene-1,3 at diene charges of 70 percent or higher, while maintaining the monoolefinic monomer charge, such as nitrile, styrene or acrylic ester correspondingly low, that is below 30 percent and preferably about 20 percent of the monomer charge. Elongation so developed exceeds by as much as three-fold the elongation in papers saturated with butadiene-nitrile copolymer latices.

The synthetic copolymer latices utilized in the invention are advantageously compatible with various resins used in compounding the unified fibrous articles, such as addition of wet strength resins, well known to those skilled in the art, for example, melamine-formaldehyde. Also, in many instances in the preparation of unified paper backings for adhesive tape, sandpaper backing, masking tape, printing tape, waterproof wrapping paper and the like unified non-woven fabrics, the impregnated material is subjected to temperatures encountered in drying and in subsequent heat treatment, as well as compounding with resins. Such procedures are advantageous in the various applications of the present invention in that the internal bond strengths developed are usually enhanced rather than impaired.

The invention is further illustrated in the following examples in its application to unified paper backings for pressure-sensitive adhesive tapes, the backing being internally bonded with the acid copolymers deposited from aqueous dispersions. Such a tape is illustrated in the accompanying drawing which show schematically a paper backing impregnated with the polycarboxylic acid-containing diene polymer of the invention and a normally tacky pressure sensitive adhesive applied to one side of the backing. It is to be understood, however, that the invention has application to various fibrous masses, webs, flexible and rigid sheeting, and other fibrous articles which are customarily internally bonded, including non-woven textile fabrics made with fibers such as, cotton, rayon, nylon, polyester and other natural and synthetic fibers. Accordingly the examples are not to be construed as a limitation of the invention, but merely illustrative of specific embodiments. Unless otherwise noted, all references to parts or percentages in these examples refer to parts or percent by weight.

EXAMPLE I

An aqueous solution consisting of 100 parts of water, an emulsifying agent (4 parts of sodium salt of an alkylaryl sulfonate), a chelating agent (0.02 part of ethylenediaminetetraacetic acid) and a peroxygen type initiator (0.15 part of potassium persulfate) was first placed in the reaction vessel. A modifier (0.8 part of mixed tertiary $C_{12}$ to $C_{16}$ mercaptans) was then placed in the reaction vessel, followed by 20 parts of acrylonitrile and then 3 parts of fumaric acid. Small amounts of the ingredients previously charged to the reaction vessel and adhering to the walls of the charging equipment were flushed into the reaction vessel with 50 parts of water, making a total of 150 parts of water. As rapidly as possible thereafter, 77 parts of liquid butadiene was added to the reaction vessel, which had been purged to remove air. The reaction vessel was brought to 50° C., the reaction mixture being agitated so as to form an emulsion. When the polymerization reaction had reached approximately 100 percent conversion the agitation was stopped and the unreacted monomers and some water were then removed by vacuum stripping. This produced an emulsion having a solids content of 42.4 percent expressed as weight of dry solids based on the total weight of the emulsion. Concentrated (28 percent) ammonium hydroxide was added to the emulsion until a pH of about 8.5 was reached. The neutralized emulsion of the acidic copolymer was stabilized by the addition, with stirring, of 2.0 parts, referred to 100 parts of dry solids, of a potassium salt of a rosin acid. To the emulsion was then added 1.0 part of antioxidant (a polyalkyl polyphenol) and 1.0 part of a melamine-formaldehyde resin. This neutralized and stabilized aqueous emulsion of an acidic copolymer (75 percent by weight butadiene, 20 percent by weight acrylonitrile, and 3 percent by weight fumaric acid) was then reduced in solids content by water addition to about 35 percent for use as an impregnating emulsion.

Various polycarboxylic acid-containing copolymer emulsions were prepared in the manner above set forth with variation in total water content between 150 and 200 parts, and variations in amounts of emulsifier, initiator and modifier. The compositions of each of the copolymers are indicated in the following tables in terms of percentage by weight of the various monomers. Highly absorbent paper strips (Paterson XL 420, 30# basis weight) were submerged in each of the copolymer emulsions. Each sheet was dipped for a period of about one minute in order to obtain complete saturation, that is, approximately 95 to 100 percent pickup (except where otherwise indicated), or expressed otherwise, until the content of polymer on a dry basis was approximately 50 percent of the weight of the impregnated sheet. The impregnated sheets were then withdrawn from the emulsion and excess emulsion removed by passing the sheets through squeeze rolls maintained under light pressure. After squeeze rolling, the impregnated paper was dried at a temperature between 140° and 170° F. for a period of about 10 minutes, followed by heating for about 3 minutes at about 300° F. The paper sheets were then subjected to a series of tests to determine the internal bond strength, tensile strength, and elongation properties developed by the impregnation with the particular copolymer. In addition, comparison tests were performed in the same manner, utilizing synthetic latex saturants devoid of polycarboxylic acid content. The polymer types included commercial butadiene-acrylonitrile copolymers with two different compositions 55 percent butadiene–45 percent acrylonitrile, and 67 percent butadiene–33 percent acrylonitrile, butadiene-styrene copolymers containing 80, 72, and 50 percent butadiene and 20, 28, and 50 percent styrene, respectively. These comparison copolymers were prepared by well known methods of aqueous alkaline polymerization. The values of the developed properties are reported as the average of tests performed on three samples impregnated with the same copolymer.

*Internal bond tests.*—Internal bond strength is determined by measurement of the resistance to delamination of the polymer-impregnated sheets. The test is identified as the Permacel Tape Corporation Ply Adhesion Test. Such tests were conducted by taking sample sheets and sealing heat-sensitive adhesive cloth-backed tape to the front and back surfaces of the sample. The sample was reduced to 1 inch by 8 inch size, and then placed in the jaws of a tensile machine. By operation of the machine the two outer pieces of cloth-backed tape were pulled apart at the rate of 12 inches per minute and a splitting or delamination of the impregnated paper sheet took place. The force required to continue the failure of the sheet by splitting or delamination was measured on a tensile testing machine (a Thwing-Albert tensile machine with an autograph recording device), and this measured force was reported as the internal bond strength of the saturated paper in ounces per inch of width of the test sample.

Tests for tensile strength of the impregnated paper were conducted by taking 1 inch by 8 inch samples of the impregnated paper and placing the ends thereof in the jaws of a standard tensile testing machine. The tensile strength was recorded by stretching the paper at the rate of 12 inches per minute in the machine direction of the paper and the pounds per inch of width at which the sample failed in tension were recorded as the tensile strength of the sample. In like manner, the percentage elongation was measured by recording the percentage of elongation which took place before failure of the sample, the elongation being measured in the machine direction of the paper sheet.

In the following tables the results of the tests of the above properties of the impregnated paper sheets are recorded. The composition of the copolymer saturant is indicated in percentage by weight of the total monomer charge, and the following abbreviations are provided for simplifying tabular identification of the particular monomer.

AN=acrylonitrile
BD=butadiene
FA=fumaric acid
ISP=isoprene
ITA=itaconic acid
MA=maleic anhydride
MAA=methacrylic acid
MMA=methyl methacrylate
ST=styrene
α-CH$_3$ST=alpha-methyl styrene

*Table 1.—Physical Properties of Paper Tape Backing*[1] *Impregnated With Various Polycarboxylic Acid-Containing Copolymers*

| Diene | Mono-olefinic Monomer | Mono COOH Acid | Poly COOH Acid | Tensile Strength,[2] lb./in. width | Elongation, Percent[2] | Internal Bond Delamination in oz./in. width[2] |
|---|---|---|---|---|---|---|
| BD 87 | MMA 10 | | FA 3 | 11.3 | 10 | 58 |
| BD 86 | AN 10 | MAA 1 | FA 3 | | | 61 |
| BD 82 | MMA 15 | | FA 3 | 11.6 | 13 | 77 |
| BD 78.5 | MMA 20 | MAA 0.5 | FA 1 | 13.0 | 10 | 77 |
| ISP 78 | MMA 20 | | FA 2 | 10.6 | 19 | 61 |
| ISP 78 | AN 20 | | FA 2 | 15.8 | 20 | 66 |
| BD 77 | AN 20 | | FA 3 | 14.3 | 15 | 72 |
| BD 76 | ST 20 | MAA 2 | MA 2 | | | 58 |
| BD 76 | AN 20 | MAA 1 | FA 3 | | | 64 |
| BD 76 | AN 20 | MAA 3 | FA 1 | 11.2 | 20 | 59 |
| BD 75 | ST 20 | | ITA 5 | | | 62 |
| BD 73 | AN 20 | | FA 7 | 14.2 | 15 | 64 |
| BD 73 | AN 23 | | ITA 4 | 15.8 | 13 | 76 |
| BD 73 | AN 25 | | ITA 2 | 15.4 | 13 | 70 |
| BD 73 | AN 19 / ST 5 | | FA 3 | 13.3 | 16 | 66 |
| BD 73 | AN 19 / ST 5 | | ITA 3 | 14.8 | 15 | 72 |
| BD 73 | AN 19 / ST 5 | | MA 3 | 12.2 | 18 | 53 |
| BD 73 | ST 24.5 | MAA 0.5 | FA 2 | 15.4 | 11 | 61 |
| BD 73 | α-CH$_3$ST 24 | | FA 3 | 14.4 | 9 | 64 |
| BD 70 | AN 20 | | ITA 10 | 16.1 | 12 | 78 |
| BD 67 | AN 30 | | FA 3 | 16.8 | 14 | 62 |
| ISP 62 | AN 35 | | FA 3 | 18.7 | 10 | 66 |
| BD 60 | AN 20 | | ITA 20 | 17.8 | 7 | 67 |
| ISP 57 | AN 40 | | FA 3 | 19.6 | 10 | 61 |
| ISP 52 | AN 45 | | FA 3 | 19.5 | 10 | 58 |
| BD 47 | MMA 50 | | FA 3 | | | 72 |
| BD 42 | MMA 55 | | FA 3 | | | 59 |
| BD 33 | ST 64 | | FA 3 | 24.1 | 8 | [3] 56 |
| BD 32 | MMA 65 | | FA 3 | | | 58 |
| BD 27 | ST 70 | | FA 3 | 27.9 | 8 | [3] 56 |
| 50-50 Blend of: BD 73 / BD 75 | AN 24.5 / AN 20 | MAA 5 | FA 2.5 | 14.1 | 13 | 58 |
| BD 67 | AN 33 | | | 12.9 | 18 | 46 |
| BD 55 | AN 45 | | | 17.0 | 12 | 43 |
| BD 80 | ST 20 | | | 9.9 | 5 | 22 |
| BD 72 | ST 28 | | | 10.5 | 6 | 24 |
| BD 50 | ST 50 | | | | | 45 |

[1] 30 lb. basis weight bleached flat backing paper. Paterson XL 420, 480 sheets 24″ x 36″ per ream.
[2] In the machine direction of the paper.
[3] At 67 percent polymer content (dry solids basis) based on weight of dry paper.

It may be seen that in all cases the internal bond of the paper impregnated with the polycarboxylic acid-containing copolymers was highly superior to that developed by the copolymers devoid of the polycarboxylic acid. Even where a lower percentage saturation (67 percent) was used with the copolymers having styrene contents of 64 and 70 percent, the superiority is striking.

This advantage of the invention which permits development of good internal bond at lower saturation is further illustrated in Table II below. Polycarboxylic acid copolymer emulsions and a non-carboxylic butadiene-acrylonitrile latex were prepared in the manner of Example I with addition of 1 or 2 parts of melamine-formaldehyde resin in each case. Two types of papers were impregnated with the emulsions in the manner above-described at varying percentages of saturation (expressed as percent weight of dry latex solids based on the weight of dry untreated paper). The samples were then subjected to the same tests for internal bond, tensile and elongation with the following results:

*Table II.—Physical Properties of Paper Backings [1] [2] Impregnated at Varying Degrees of Saturation*

| Percent Saturation | Tensile Strength, lb./in. width | Elongation, percent | Internal Bond Delamination in oz./in. width |
|---|---|---|---|
| 1. Latex—Composition BD/AN/MAA/FA,[3] percent by weight, 75/20/3/2 | | | |
| 19 | 14.3 | 26 | 26 |
| 38 | 14.0 | 27 | 35 |
| 59 | 16.8 | 30 | 61 |
| 79 | 16.4 | 29 | 74 |
| 92 | 16.2 | 30 | 80 |
| 2. Latex—Composition BD/AN/FA,[4] percent by weight, 73/24/25/2.75 | | | |
| 23 | -------- | -------- | 32 |
| 46 | -------- | -------- | 46 |
| 60 | -------- | -------- | 64 |
| 95 | -------- | -------- | 80 |
| 3. Latex—Composition BD/AN, percent by weight, 67/33 | | | |
| 21 | 11.5 | 21 | 14 |
| 38 | 13.4 | 30 | 22 |
| 60 | 13.1 | 31 | 37 |
| 81 | 13.8 | 30 | 42 |
| 98 | 13.8 | 34 | 42 |
| 4. Latex—Composition BD/AN/MAA/FA,[3] percent by weight, 75/20/3/2 | | | |
| 22 | 13.7 | 11 | 11 |
| 36 | 14.0 | 14 | 26 |
| 59 | 13.4 | 13 | 43 |
| 78 | 15.3 | 16 | 54 |
| 93 | 16.0 | 17 | 66 |
| 5. Latex—Composition BD/AN/FA,[4] percent by weight, 73/24.25/2.75 | | | |
| 30 | -------- | -------- | 16 |
| 48 | -------- | -------- | 34 |
| 63 | -------- | -------- | 53 |
| 100 | -------- | -------- | 76 |
| 6. Latex—Composition BD/AN, percent by weight, 67/33 | | | |
| 21 | 12.0 | 11 | 8 |
| 41 | 12.8 | 16 | 19 |
| 59 | 13.8 | 15 | 26 |
| 78 | 14.1 | 16 | 38 |
| 95 | 14.0 | 18 | 45 |

[1] Semi-bleached kraft crepe paper, 30 lb. basis weight (480 sheets, 24″ x 36″ per ream) Brown Company 301 M.
[2] Bleached flat backing paper, 30 lb. basis weight (480 sheets, 24″ x 36″ per ream) Paterson XL 420.
[3] 2 parts melamine-formaldehyde resin.
[4] 1 part melamine-formaldehyde resin.

It is evident that lower degrees of saturation with the polycarboxylic acid copolymers develop internal bond strengths comparable to much higher percentages of saturation using non-carboxylic butadiene acrylonitrile latices.

The ability of papers impregnated with the acid copolymers to retain high internal bond strength with various pigment loadings in the emulsion, and the low internal bond obtained with a non-carboxylic nitrile latex is shown in Table III.

*Table III.—Internal Bond of Latex Impregnated Paper [1] With Various Amounts of $TiO_2$*

| Latex | $TiO_2$ | Internal Bond Delamination in oz./in. width |
|---|---|---|
| 1. Composition—BD/AN/MAA/FA, percent weight, 75/20/3/2 | -------- | 74 |
|  | 5 | 69 |
|  | 10 | 64 |
|  | 15 | 54 |
| 2. Composition—BD/ST/MAA/FA, percent weight, 73/24.5/0.5/2 | -------- | 61 |
|  | 10 | 61 |
| 3. Composition—BD/AN, percent weight, 67/33 | -------- | 45 |
|  | 5 | 39 |
|  | 10 | 36 |
|  | 15 | 32 |

[1] Bleached flat backing paper, 30 lb. basis weight (480 sheets, 24″ x 36″ per ream) Paterson XL 420.

The development of improved elongation with high internal bond in the impregnated paper utilizing small quantities of a monocarboxylic acid in addition to the polycarboxylic acid in the preparation of butadiene copolymers is demonstrated in Table IV below. The copolymer emulsions were prepared according to Example I except that one part of modifier (mixed tertiary $C_{12}$ to $C_{16}$ mercaptans) was used. The only factor affecting the elongation was the difference in copolymer composition, i.e. presence or absence of the monocarboxylic acid. The paper samples were impregnated as set forth above, using bleached flat backing paper, 30# basis weight (480 sheets, 24″ x 36″ per ream) Paterson XL 420.

*Table IV*

| Diene | Mono-olefinic Monomer | Mono COOH Acid | Poly COOH Acid | Tensile Strength, lb./in. width | Elongation | Internal Bond Delamination in oz./in. width |
|---|---|---|---|---|---|---|
| BD 73 | AN 25 | -------- | FA 2 | 12.2 | 9.2 | 59 |
| BD 76 | AN 20 | -------- | FA 1 | 11.2 | 20.0 | 59 |
| BD 75 | AN 20 | MAA 3 | FA 2 | 11.6 | 18.4 | 58 |

The decided improvement in elongation by substitution of isoprene for butadiene in the polycarboxylic acid copolymers is clearly shown in Table V. The copolymers were prepared in accordance with Example I.

*Table V*

| Diene | Mono-olefinic Monomer | Poly COOH Acid | Tensile Strength, lb./in. width | Elongation | Internal Bond Delamination in oz./in. width |
|---|---|---|---|---|---|
| ISP 78 | AN 20 | FA 2 | 15.1 | 29.2 | 62 |
| ISP 78 | AN 20 | FA 2 | 14.9 | 30.0 | 58 |
| ISP 78 | MMA 20 | FA 2 | 10.6 | 19.2 | 61 |

It may be seen from the foregoing that the invention provides unified non-woven fibrous articles which exhibit an internal bond strength, or resistance to delamination measured in ounces per inch of paper sample, superior to the internal bond of non-woven fibrous articles unified with a copolymer which does not contain polycarboxylic acid. Where development of maximum internal bond strength provided by the invention is not a requirement, and internal bond strengths obtainable with standard polymer latex saturants are acceptable, the invention provides a distinct advantage of permitting utilization of substantially smaller quantities of copolymer through reduction in the percent saturation of the fiber, while still obtaining the requisite internal bond strength.

It may be stated that in the embodiments described above, the ply adhesion tests utilizing bleached flat backing paper of 30 lb. basis weight, 480 sheets of 24" by 36" to the ream with 95 to 100 percent saturation were productive of internal bond strengths at least about 58 ounces per inch of width.

The unified non-woven fibrous articles in the invention are extremely well internally bonded and consequently are particularly suitable with normally adhesive material as a backing for pressure-sensitive adhesive tapes, printed tapes, sandpaper, and protective packaging.

The high internal bond developed permits repeated application and removal of the pressure-sensitive adhesive tapes from surfaces to which it is adherent without splitting or delamination of the backing.

Further, in view of the ability to obtain high internal bond strength at relatively low degrees of saturation, and the fact that the tear strength of impregnated paper and other fibers increases as the degree of saturation is reduced, the invention advantageously permits achievement of an excellent balance of properties heretofore not obtainable by varying the percent saturation of the fiber. In addition, the polycarboxylic acid containing copolymer latices permit pigmentation of the saturant for the production of colored tapes while satisfactory internal bond strength is maintained and larger quantities of pigments and fillers than could heretofore be tolerated may be utilized with retention of the high internal bond developed according to the invention. Also, by utilization of oil and solvent resistance imparting components in the preparation of the copolymers, the articles of the invention are most suitable in end applications, such as masking tape where penetration or seepage of lacquer and paint solvents through the tape must be prevented in order to avoid marring of the underlying surface.

Various modifications and alternatives may be utilized in the practice of the invention, which are encompassed within its scope, including those which suggest themselves to those skilled in the art, and are to be regarded as within the scope of the claims hereafter appended.

We claim:

1. A fibrous article comprising a unified mass of non-woven fibrous material internally bonded with a unifying composition comprising a copolymer of at least one aliphatic conjugated diene and at least one copolymerizable ethylenically unsaturated monomer, said copolymer containing carboxylic acid groups provided by a polycarboxylic acid constituent in turn provided by said unsaturated monomer and said acid constituent being present in minor amount.

2. A fibrous article comprising a unified mass of non-woven fibrous material internally bonded with a unifying composition comprising a polycarboxylic acid-containing copolymer of at least one aliphatic conjugated diene, at least one copolymerizable olefinically unsaturated polycarboxylic acid, and at least one copolymerizable monoolefinic monomer other than said acid, the polycarboxylic acid content being present in minor amount.

3. An article according to claim 2 in which the copolymer is formed by acidic copolymerization of monomeric material comprising from about 20 to 90 percent of said diene, about 10 to 75 percent of said monomer, and about 0.05 to 20 percent of said acid.

4. A fibrous article comprising a non-woven fibrous web with high resistance to delamination, said web being internally bonded with a unifying composition comprising a polycarboxylic acid-containing copolymer of a major portion of at least one aliphatic conjugated diene having from 4 to 10 carbon atoms and at least one copolymerizable monoolefinic monomer selected from the group consisting of nitriles, styrenes, and lower molecular weight alcohol esters of acrylic and alpha-substituted acrylic acids, and a minor portion of at least one copolymerizable olefinically unsaturated polycarboxylic acid.

5. An article according to claim 4 in which the copolymer is prepared from monomeric material containing from about 20 to 90 percent of said diene, from about 10 to 75 percent of said monomer, and from about 1 to 20 percent of said polycarboxylic acid.

6. An article according to claim 4 in which the copolymer is prepared from monomeric material containing from about 50 to 90 percent butadiene-1,3, about 10 to 45 percent acrylonitrile, and about 1 to 20 percent of said polycarboxylic acid.

7. An article according to claim 4 in which the copolymer is prepared from monomeric material containing from about 20 to 90 percent butadiene-1,3, about 10 to 75 percent styrene, and about 1 to 20 percent of said polycarboxylic acid.

8. An article according to claim 4 in which the copolymer is prepared from monomeric material containing from about 20 to 90 percent butadiene-1,3, about 10 to 70 percent methyl methacrylate and about 1 to 20 percent of said polycarboxylic acid.

9. A fibrous article comprising flexible paper sheeting internally bonded with from about 30 to 60 percent by weight of said bonded sheeting of an aqueous dispersion-deposited copolymer of at least one aliphatic conjugated diene having 4 to 10 carbon atoms, and at least one copolymerizable monoolefinic monomer, said copolymer containing carboxylic acid groups provided by a polycarboxylic acid constituent in turn provided by said unsaturated monomer, said acid constituent being present in minor amount, said paper sheeting having a resistance to delamination superior to that obtained by internal bonding with a like copolymer devoid of polycarboxylic acid content.

10. A fibrous article comprising flexible paper sheeting internally bonded with from about 30 to 60% by weight of said bonded sheeting of a unifying composition comprising an aqueous dispersion-deposited copolymer of from about 20 to 90% of at least one aliphatic conjugated diene having 4 to 10 carbon atoms, from about 10 to 75% of at least one copolymerizable monoelefinic monomer selected from the group consisting of nitriles, styrenes and lower molecular weight alcohol esters of acrylic and alpha-substituted acrylic acids, and from about 1 to 20% of a copolymerizable olefinically unsaturated polycarboxylic acid.

11. An article according to claim 10 in which the copolymer is prepared from monomeric material containing from about 50 to 90 percent butadiene-1,3, 10 to 45 percent acrylonitrile and 1 to 5 percent of a dicarboxylic acid selected from the group consisting of fumaric and itaconic acids.

12. An article according to claim 10 in which the copolymer is prepared from monomeric material containing from about 20 to 90 percent butadiene-1,3, about 10 to 75 percent styrene and about 1 to 5 percent of said dicarboxylic acid.

13. An article according to claim 10 in which the copolymer is prepared from monomeric material containing from about 20 to 90 percent butadiene-1,3, about 10 to 70 percent methyl methacrylate and about 1 to 5 percent of said dicarboxylic acid.

14. A normally tacky pressure-sensitive adhesive tape having a flexible paper backing sheet internally bonded with from about 30 to 60 percent by weight of the internally bonded sheet of an aqueous dispersion deposited polycarboxylic acid-containing copolymer of 1,3-butadiene, about 10 to 75 percent by weight of a monoolefinically unsaturated monomer copolymerizable with said diene, and from about 1 to 20 percent by weight of a copolymerizable olefinically unsaturated polycarboxylic acid.

15. An article according to claim 14 in which the copolymerizable monomer is selected from the group consisting of nitriles, styrenes and lower molecular weight alcohol esters of acrylic and alpha-substituted acrylic acids.

16. A fibrous article comprising flexible paper sheeting with high resistance to delamination and improved elongation, said sheeting being internally bonded with from about 30 to 60 percent by weight of said bonded sheeting of an aqueous dispersion deposited polycarboxylic acid-containing copolymer of from about 70 to 90 percent isoprene, about 20 to 30 percent acrylonitrile and about 1 to 5 percent of a copolymerizable olefinically unsaturated polycarboxylic acid.

17. An article according to claim 16 in which the monomeric material contains 75 to 78 percent isoprene, about 20 percent acrylonitrile and about 2 to 5 percent fumaric acid.

18. A fibrous article comprising a non-woven fibrous web with high resistance to delamination, said web being internally bonded with a unifying composition comprising a copolymer prepared from monomeric material containing from about 20 to 90% of at least one aliphatic conjugated diene having from 4 to 10 carbon atoms, from about 10 to 75% of at least one copolymerizable monoolefinic monomer selected from the group consisting of nitriles, styrenes and lower molecular weight alcohol esters of acrylic and alpha-substituted acrylic acid, from about 1 to 20% of at least one copolymerizable olefinically unsaturated polycarboxylic acid, and from about 0.5 to 5% of a copolymerizable olefinically unsaturated monocarboxylic acid.

19. A pressure-sensitive adhesive tape containing a coating of a normally tacky pressure-sensitive adhesive on a backing of paper sheeting, said sheeting being internally bonded with from about 30 to 60 percent by weight of said bonded sheeting of an aqueous dispersion-deposited copolymer of at least one aliphatic conjugated diene having 4 to 10 carbon atoms, and at least one copolymerizable ethylenically unsaturated monomer, said copolymer containing carboxylic acid groups provided by a polycarboxylic acid constituent in turn provided by said unsaturated monomer, said acid constituent being present in minor amount, and said paper sheeting having a resistance to delamination superior to that obtained by internal bonding with a like copolymer devoid of polycarboxylic acid.

20. A fibrous article comprising flexible paper sheeting internally bonded with from about 30 to 60% by weight of said bonded sheeting of an aqueous dispenser-deposited copolymer prepared from monomeric material containing from about 20 to 90% of at least one aliphatic conjugated diene having 4 to 10 carbon atoms, from about 10 to 75% of at least one copolymerizable monoolefinic monomer, and from about 1 to 20% of a copolymerizable olefinically unsaturated dicarboxylic acid, and from about 0.5 to 5% of a copolymerizable olefinically unsaturated monocarboxylic acid.

21. A fibrous article comprising flexible paper sheeting internally bonded with from about 30 to 60% by weight of said bonded sheeting of an aqueous dispersion-deposited copolymer prepared from monomeric material containing from about 50 to 90% 1,3-butadienes, about 10 to 45% acrylonitrile, about 1 to 5% of a copolymerizable olefinically unsaturated dicarboxylic acid selected from the group consisting of fumaric and itaconic acids, and from about 0.5 to 5% methacrylic acid.

22. A fibrous article comprising flexible paper sheeting internally bonded with from about 30 to 60% by weight of said bonded sheeting of an aqueous dispersion-deposited copolymer prepared from monomeric material containing from about 20 to 90% 1,3-butadiene, about 10 to 70% methyl methacrylate, about 1 to 5% of a copolymerizable olefinically unsaturated dicarboxylic acid selected from the group consisting of fumaric acids, and from about 0.5 to 5% methacrylic acid.

References Cited in the file of this patent

UNITED STATES PATENTS

| | | |
|---|---|---|
| 2,438,195 | Tierney | Mar. 23, 1948 |
| 2,544,691 | Kugler et al. | Mar. 13, 1951 |
| 2,583,326 | D'Alelio | Jan. 22, 1952 |
| 2,710,292 | Brown | June 7, 1955 |
| 2,725,981 | Abere et al. | Dec. 6, 1955 |
| 2,726,967 | Eger et al. | Dec. 13, 1955 |
| 2,772,970 | Feigley | Dec. 4, 1956 |
| 2,840,442 | Abrams et al. | June 24, 1958 |
| 2,848,105 | Bartell et al. | Aug. 19, 1958 |
| 2,848,355 | Bartell | Aug. 19, 1958 |
| 2,961,348 | Finnegan et al. | Nov. 22, 1960 |